(12) United States Patent
Leising et al.

(10) Patent No.: US 6,869,382 B2
(45) Date of Patent: Mar. 22, 2005

(54) DOUBLE-DOWNSHIFT GEAR STRATEGY FOR A DUAL CLUTCH AUTOMATIC TRANSMISSION

(75) Inventors: Maurice B Leising, Clawson, MI (US); Hussein A Dourra, Bloomfield, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/431,261

(22) Filed: May 7, 2003

(65) Prior Publication Data

US 2004/0224818 A1 Nov. 11, 2004

(51) Int. Cl.⁷ .............................................. B60K 41/02
(52) U.S. Cl. ........................ 477/77; 477/175; 477/180; 477/181
(58) Field of Search .......................... 477/77, 181, 180, 477/174, 175

(56) References Cited

U.S. PATENT DOCUMENTS

| | | |
|---|---|---|
| 2,658,405 A | 11/1953 | Dodge |
| 2,911,848 A * | 11/1959 | Carnagua .................... 477/105 |
| 3,236,117 A * | 2/1966 | Christenson ................ 477/114 |
| 3,774,460 A | 11/1973 | Browning et al. |
| 4,376,473 A | 3/1983 | Tomasek et al. |
| 4,412,461 A | 11/1983 | Windsor |
| 4,513,631 A | 4/1985 | Koivunen |
| 4,519,484 A | 5/1985 | Nagaoka et al. |
| 4,527,678 A | 7/1985 | Pierce et al. |
| 4,611,698 A | 9/1986 | Lehmann |
| 4,658,663 A | 4/1987 | Hiraiwa |
| 4,790,418 A | 12/1988 | Brown et al. |
| 4,860,607 A | 8/1989 | Numazawa et al. |
| 4,916,979 A * | 4/1990 | Irwin .......................... 477/94 |
| 4,989,477 A * | 2/1991 | Hunter et al. ............... 477/148 |
| 5,042,327 A * | 8/1991 | Stainton ...................... 477/73 |
| 5,050,458 A * | 9/1991 | Vukovich et al. ........... 477/154 |
| 5,125,282 A | 6/1992 | Bender et al. |
| 5,603,242 A | 2/1997 | Krieger |
| 5,711,409 A | 1/1998 | Murata |
| 5,720,203 A | 2/1998 | Honda et al. |
| 5,823,051 A | 10/1998 | Hall, III |
| 5,890,392 A | 4/1999 | Ludanek et al. |
| 5,915,512 A | 6/1999 | Adamis et al. |
| 5,950,781 A | 9/1999 | Adamis et al. |
| 5,964,675 A | 10/1999 | Shimada et al. |
| 5,966,989 A | 10/1999 | Reed, Jr. et al. |
| 5,997,433 A | 12/1999 | Domian et al. |
| 6,012,561 A | 1/2000 | Reed, Jr. et al. |

(Continued)

Primary Examiner—Tisha Lewis
(74) Attorney, Agent, or Firm—Thomas A. Jurecko

(57) ABSTRACT

A method of double-downshifting from a first gear ratio to a second gear ratio includes the steps of first reducing torque transfer from a first clutch to a first driven gear. Engine speed then increases. Next, torque transfer from a second clutch to a third driven gear is increased while simultaneously the first clutch is disengaged from the first driven gear. Torque transfer from the second clutch to the third driven gear is then reduced. Torque transfer from the second clutch to the third driven gear is next increased. The first clutch is engaged to the second driven gear. Then, torque transfer from the first clutch to the second driven gear is increased while simultaneously the torque transfer from the second clutch to the third driven gear is reduced. Finally, the second clutch is disengaged from the third driven gear.

14 Claims, 13 Drawing Sheets

U.S. PATENT DOCUMENTS

| | | |
|---|---|---|
| 6,044,719 A | 4/2000 | Reed, Jr. et al. |
| 6,055,879 A | 5/2000 | Abe et al. |
| 6,209,406 B1 | 4/2001 | Sperber et al. |
| 6,209,407 B1 * | 4/2001 | Heinzel et al. ............... 74/331 |
| 6,210,298 B1 | 4/2001 | Baur et al. |
| 6,375,597 B1 * | 4/2002 | Popp et al. .................. 477/97 |
| 6,397,692 B1 | 6/2002 | Carriere |
| 6,463,821 B1 | 10/2002 | Reed, Jr. et al. |
| 6,497,161 B2 * | 12/2002 | Poljansek et al. ............. 74/335 |
| 6,595,077 B1 * | 7/2003 | Geiberger et al. ............ 74/330 |
| 6,658,339 B1 * | 12/2003 | Wright et al. ................. 701/53 |
| 2004/0043857 A1 * | 3/2004 | Nishida et al. ............. 475/125 |

* cited by examiner

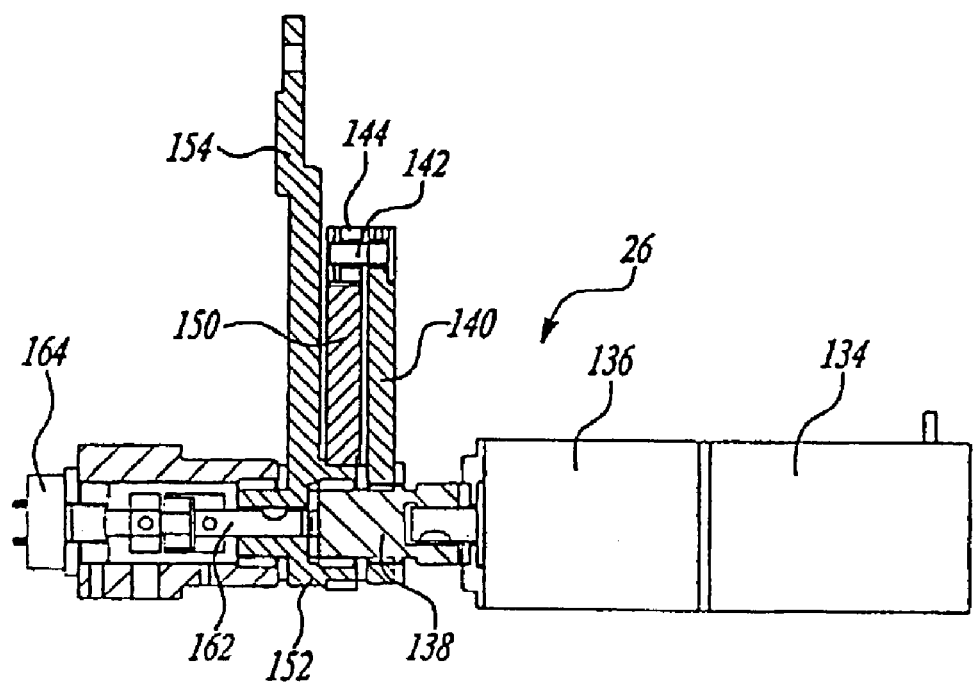
_Fig-3_
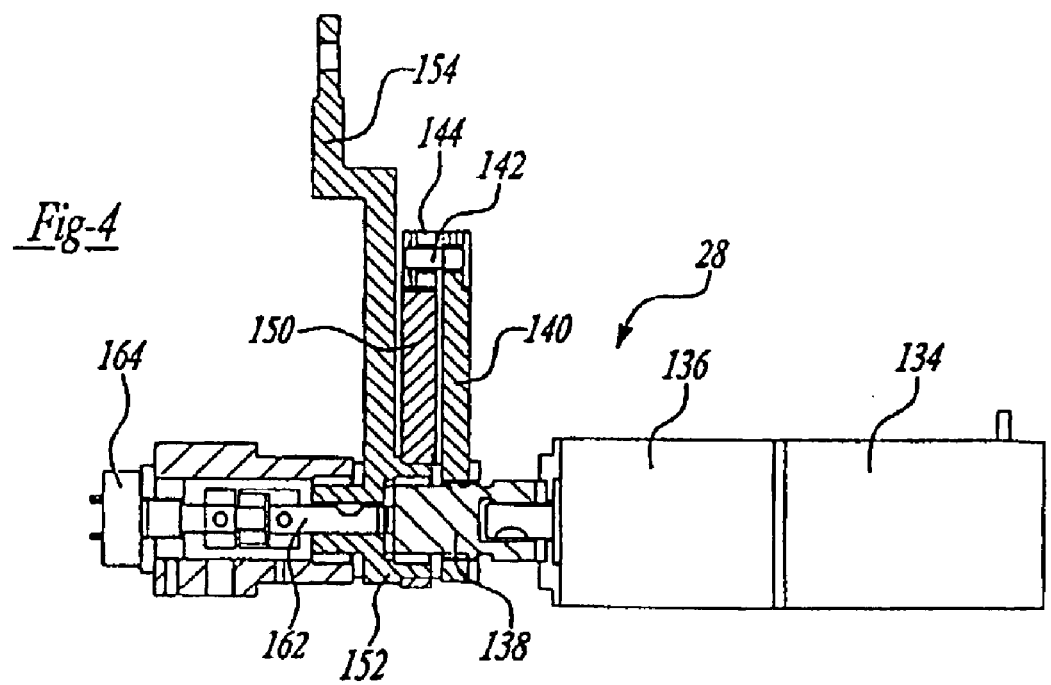
_Fig-4_

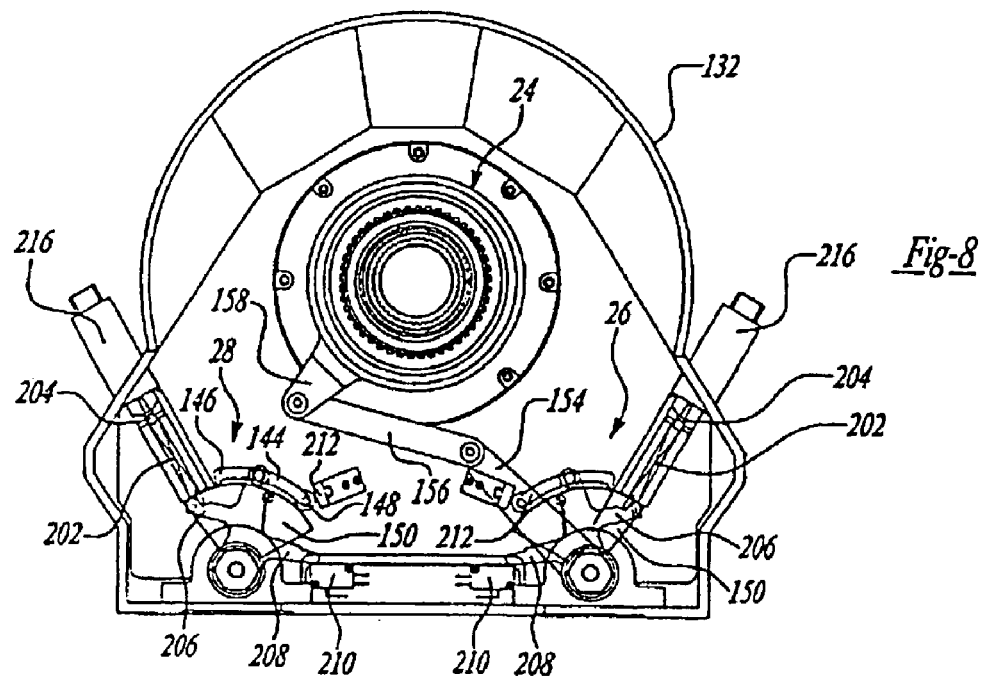
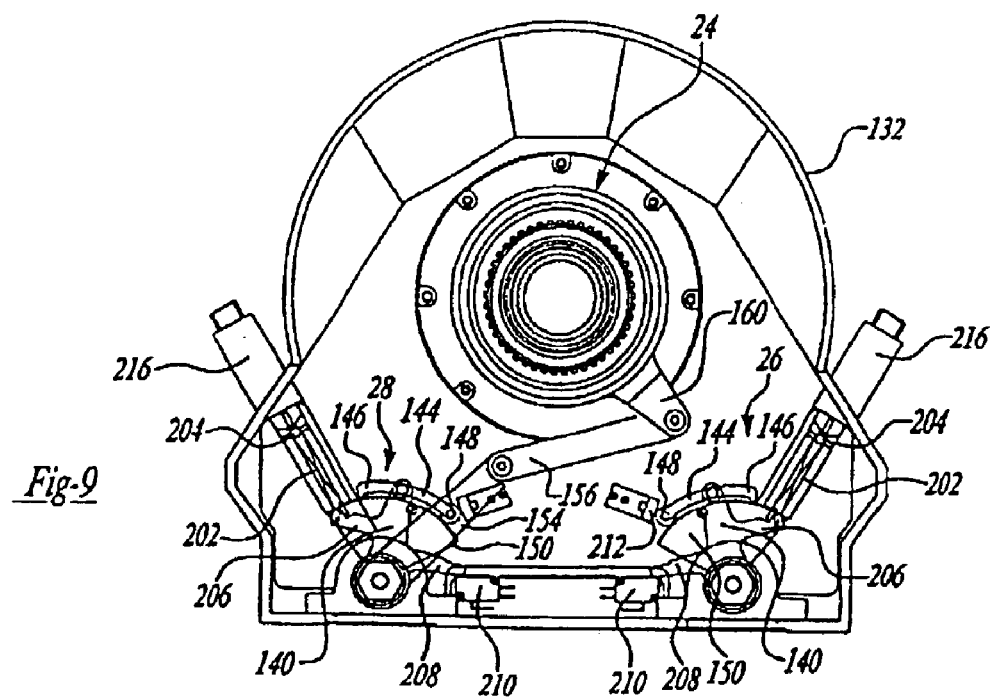

DOUBLE-DOWNSHIFT GEAR STRATEGY FOR A DUAL CLUTCH AUTOMATIC TRANSMISSION

FIELD OF THE INVENTION

The present invention relates to dual clutch automatic transmissions and more particularly to a double-downshift gear strategy for a dual clutch automatic transmission.

BACKGROUND OF THE INVENTION

Dual clutch transmissions that include automated electro-mechanical shifting mechanisms and methods are known in the art. For example, U.S. Pat. Nos. 6,463,821, 6,044,719 and 6,012,561, which are each incorporated herein by reference in their entirety, disclose a dual clutch electo-mechanical automatic transmission.

In general, these dual clutch type systems attempt to reduce the jolt associated with torque interruption as gears are shifted by starting to engage the next gear with one clutch while the current gear is disengaged with the other clutch. To further reduce the jolt associated with gear shifts in these types of transmissions, methods to control dual clutch transmissions have also been proposed.

For example, U.S. Pat. Nos. 5,950,781 and 5,915,512 each disclose a twin-clutch transmission having two input shafts and a method for controlling the transmission. The first input shaft is attached to the primary drive gears, and the second input shaft is attached to one or more auxiliary gears. The method disclosed is for controlling a gear shift between primary gears on the first input shaft wherein an auxiliary gear on the second input shaft provides a filler torque during the change in primary gears. This method is designed to reduce the jolt associated with the primary gear changes by use of the filler torque.

Although these methods reduce the jolt from the gears being changed, they do not address the situation wherein a rapid double-downshifting is required, for example from $6^{th}$ gear to $4^{th}$ gear, or $3^{rd}$ gear to $1^{st}$ gear. Therefore, there is a need in the art for a method of double-downshifting a dual clutch automatic transmission that reduces the jolts associated with such an endeavor, while simultaneously completing the double downshift in as rapid a time as possible.

SUMMARY OF THE INVENTION

A method for double downshifting a transmission in a motor vehicle is provided. The motor vehicle has an engine and a transmission. The transmission includes two clutches. The first clutch assembly transfers torque to first, third and fifth driven gears. The second clutch assembly transfers torque to second, fourth and sixth driven gears. A method for double downshifting implies transferring the engine torque from a set of odd driven gears (or even gears) to another set of odd driven gears (or even gears). The ratio of the first odd (or even) gear is less than the ratio of the second odd (or even) gear.

The method of double-downshifting from the first gear ratio (e.g. $6^{th}$ gear ratio) to the second gear ratio (e.g. $4^{th}$ gear ratio) comprises the steps of first reducing torque transfer from the first clutch to the first driven gear ($6^{th}$ gear). Engine speed then increases. Next, torque transfer from the second clutch to the third driven gear (e.g. $5^{th}$ gear ratio) is increased while simultaneously the first clutch is disengaged from the first driven gear ($6^{th}$ gear). This allows the first driven gear to be changed from $6^{th}$ to $4^{th}$. Torque transfer from the second clutch to the third driven gear ($5^{th}$ gear) is then reduced. Torque transfer from the second clutch to the third driven gear ($5^{th}$ gear) is next increased. After gear change, the first clutch is engaged to the second driven gear. Then, torque transfer from the first clutch to the second driven gear is increased while simultaneously the torque transfer from the second clutch to the third driven gear is reduced. Finally, the second clutch is disengaged from the third driven gear.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a side view of the R-1-3-5 side clutch actuator according to the present invention;

FIG. 4 is a side view of the 2-4-6 hill holder side clutch actuator according to the present invention;

FIG. 8 is an end view of the clutch actuator assembly and dual cam assembly, with the right side clutch actuator in the adjust position;

FIG. 9 is an end view of the clutch actuator and dual cam assembly as shown in FIG. 6, with the left side clutch actuator in the disengaged position;

DETAILED DESCRIPTION OF THE PREFERRED EMBODIMENTS

The following description of the preferred embodiments is merely exemplary in nature and is in no way intended to limit the invention, its application, or uses.

The present invention pertains to a method for controlling a dual clutch automatic transmission. Although the present invention is applicable to virtually any dual clutch transmission, the method of the preferred embodiment is illustrated with the electromechanical automatic transmission disclosed in commonly assigned U.S. Pat. No. 6,012,561, which is hereby incorporated by reference in its entirety.

Figure 17:
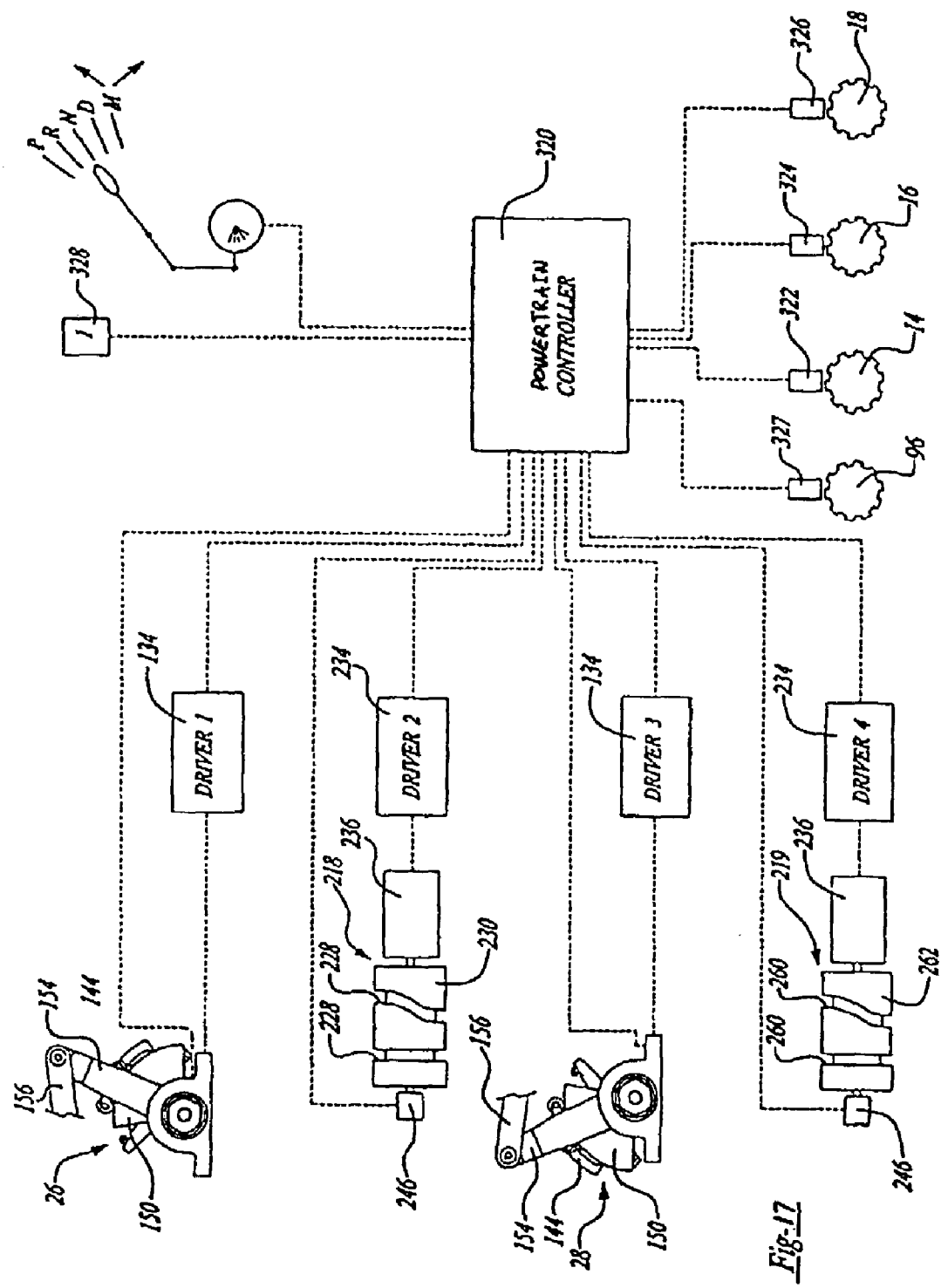
FIG. 17 is a schematic illustration of the control system for the electro-mechanical automatic transmission according to the principles of the present invention.
Figure 18:
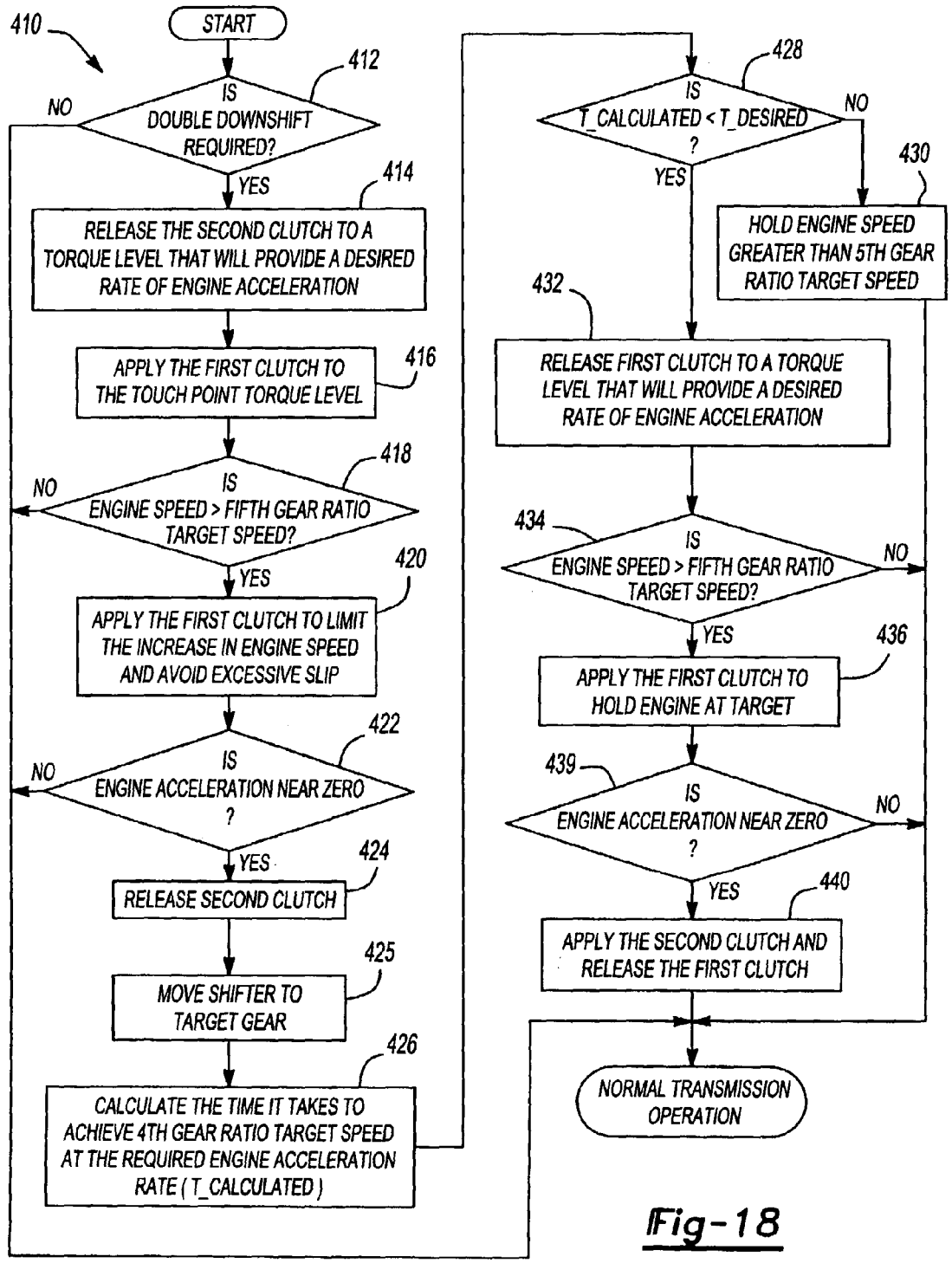
FIG. 18 is a flow chart illustrating the double-downshift gear shift strategy for the dual clutch transmission according to the principles of the present invention.
Figure 19:
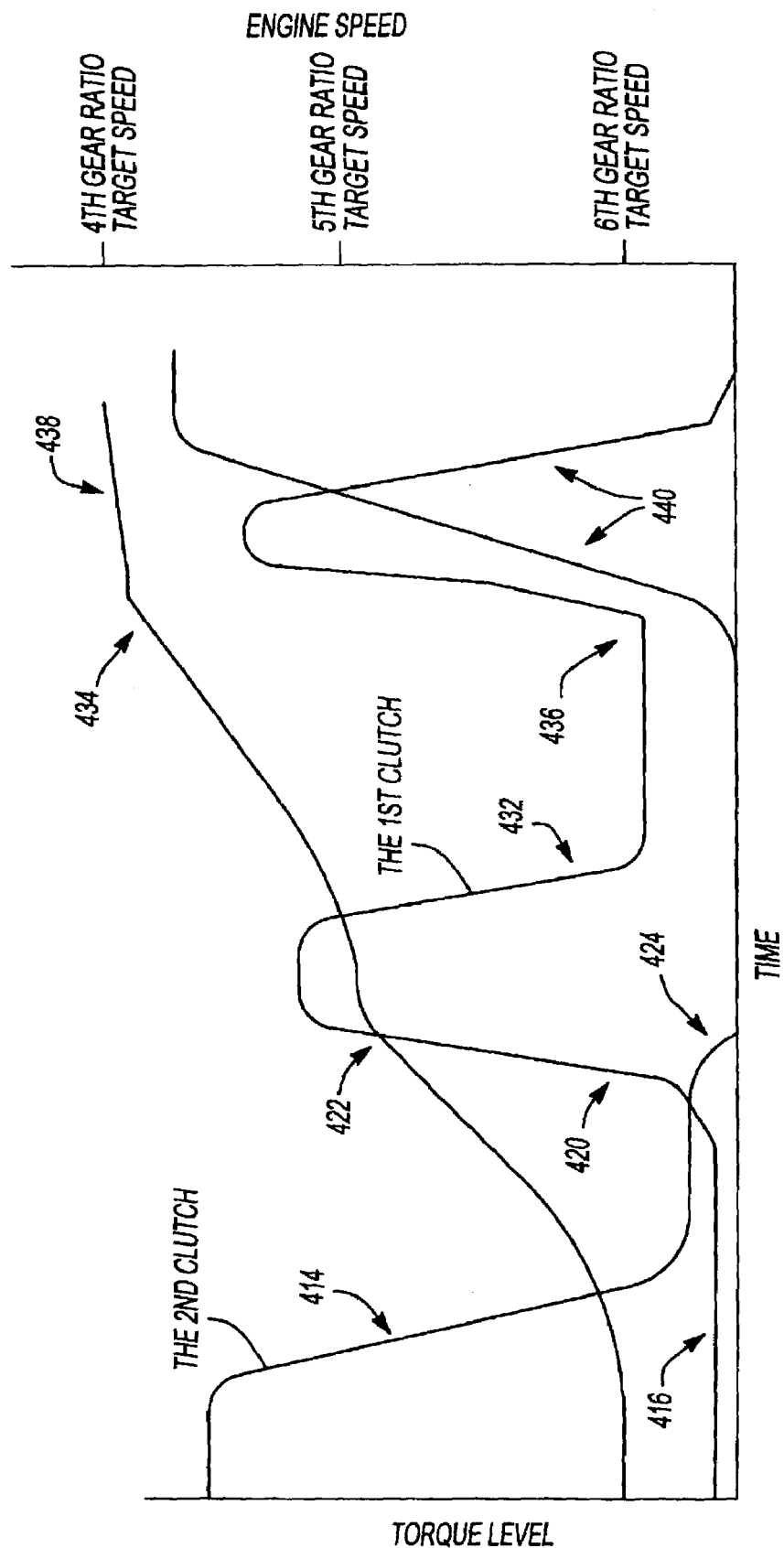
FIG. 19 is a graph illustrating the relationship between the clutches, gear ratios, and the engine speed during the double-downshift gear shift strategy for the dual clutch transmission according to the principles of the present invention.

With reference to the accompanying drawings, the dual clutch automatic transmission 10, according to the principles of the present invention, will be addressed first, with particular reference to FIGS. 1–17, and the method of controlling the dual clutch automatic transmission 10 using a double-downshift gear strategy 410 will be addressed thereafter, with particular reference to FIGS. 18–19.

Accordingly, the dual clutch automatic transmission 10 is provided with a gear train 12 which includes a first input shaft 14 and a second hollow input shaft 16 which is concentric with the first input shaft 14. Each of the input shafts 14, 16 support a plurality of rotatably mounted drive gears which are engaged with respective driven gears mounted to a driven shaft 18. A first friction clutch 20 is provided for transmitting torque from the engine output shaft (not shown) to the first input shaft 14. A second friction clutch 22 is provided for transmitting drive torque from the engine output shaft to the second input shaft 16. A dual cam assembly 24, along with first and second clutch actuators 26, 28 (see FIGS. 3–4 and 6–10) are provided for selectively disengaging the first and second friction clutches 20, 22.

The gear train 12 includes a reverse 30, first 32, third 34, and fifth 36 speed gears, each having a gear ratio, rotatably mounted to the first input shaft 14. A reverse-first synchronizer device 38 is provided for selectively engaging the reverse gear 30 and first speed gear 32 to the first input shaft 14. A third-fifth synchronizer device 40 is provided for selectively engaging the third and fifth speed gears 34, 36 to the first input shaft 14. Second 42, fourth 44, and sixth 46 speed gears, each having a gear ratio, are rotatably mounted to the second input shaft 16. A second-fourth synchronizer device 48 is provided for selectively engaging the second and fourth speed gears, 42, 44, respectively to the second input shaft 16. A sixth speed/hill holder synchronizer device 50 is provided for selectively engaging the sixth speed gear 46 to the second input shaft 16. In addition, the sixth speed/hill holder synchronizer 50 also engages an overrunning one-way clutch (Hill-Holder) device 52 for preventing the vehicle from rolling backward down a hill.

The first input shaft 14 is supported by a bearing assembly 54. Bearing assembly 54 has an inner race 54a supported on the first input shaft 14 and an outer race 54b supported on the second input shaft 16. The second input shaft 16 includes a two-piece construction with a first shaft portion 16A and a second shaft portion 16B, each fastened together by a plurality of fasteners and/or pins 53 generally in the vicinity of the bearing 54. In addition, a seal 55 is provided between the first shaft portion 16A of the second input shaft 16 and the first input shaft 14. At a second end, the first input shaft 14 is supported by a needle bearing assembly 60 disposed within a central hub portion of fifth speed gear 36. Fifth speed gear 36 is supported by the end plate 62 via a bearing assembly 64. A center plate 66 is provided within the housing 58 and is provided with an opening 68 through which the first and second input shafts 14, 16 extend. The second input shaft 16 is supported within a front plate 56 of the transmission housing 58 via a bearing assembly 70 which is generally concentric with bearing 54. The driven shaft 18 is supported at a front end by the front plate 56 via a bearing assembly 72 and at a rear end by the end plate 62 via a bearing assembly 74. The driven shaft 18 is provided with a reverse driven gear 76, a first speed driven gear 78, a second speed driven gear 80, a third speed driven gear 82, a fourth speed driven gear 84, a fifth speed driven gear 86, a sixth speed driven gear 88, and a parking gear 90. The driven shaft 18 extends through an opening 92 in center plate 66 and is supported by needle bearing assembly 94.

The first input shaft 14 is drivingly engaged with the engine output shaft via first clutch 20, while second input shaft 16 is engaged with the engine output shaft via second clutch 22. The first and second clutches 20, 22 include a flywheel assembly including a first flywheel 96 which is mounted to the engine output shaft (not shown). A second flywheel 98 is mounted to the first flywheel 96 for rotation therewith. The first clutch 20 includes a friction plate 100 disposed between the first flywheel 96 and a pressure plate 102. Pressure plate 102 is biased by a Belleville spring 104 into a normally engaged position. The friction plate 100 is engaged with a hub portion 106 which is mounted to the first input shaft 14 via a spline connection. A torsion spring system 108 is provided between the friction plate and the hub 106, as is well known in the art. A plurality of levers 110 engage the dual cam assembly 24 and are attached to linkages 112 which are attached to the pressure plate 102 for disengaging the pressure plate 102 from the friction plate 100 in order to disengage the first clutch 20 upon actuation of the clutch actuator 28 and dual cam assembly 24. Levers 110 pivot about pivots 113 which are attached to the clutch cover plate 122. Linkages 112 are attached to the levers 110 by a pivot 114 and to the pressure plate 102 at pivot 115. As the levers 110 are pivoted about pivots 113 by the dual cam assembly 124, linkages 112 are pulled in a direction away from the first flywheel 96, thereby disengaging the first clutch 20.

The second clutch 22 similarly includes a friction plate 116 which is disposed between the second flywheel 98 and a pressure plate 118. A Belleville spring 120 is provided between the pressure plate 118 and a clutch cover plate 122. The second clutch 22 includes a hub 124 which is connected to the second input shaft 16 by a spline connection. The friction plate 116 is connected to the hub 124 via a torsion spring assembly 126, as is known in the art. A disengagement lever 128 engages the dual cam assembly 24 and is attached to a plurality of linkages 130 that are operable to disengage the second clutch 22. The disengagement levers 128 pivot about pivots 129 which are attached to the clutch cover plate 122. Linkages 130 are attached to the levers 128 by a pivot 131 and to the pressure plate 118 at pivot 133. As the levers 128 are pivoted about pivots 129 by the dual cam assembly 24, the linkages 130 are pulled in a direction away from the second flywheel 98 thereby disengaging the second clutch 22.

The first and second clutches 20, 22 are supported within a bell housing 132 by the flywheel 96 along with the dual cam assembly 24 and clutch actuators 26, 28 which are supported by the bell housing 132. The flywheel 96 is supported by the engine output shaft (not shown). With reference to FIGS. 3 and 4, the clutch actuators 26 and 28 will now be described. It should be understood that the left and right side clutch actuators 26, 28 are virtually identical in their construction. Accordingly, a single description with respect to the right and left side clutch actuators 26, 28 will be provided wherein like reference numerals designate common elements. The clutch actuators 26, 28 include an electric motor 134 which drives a planetary reduction gear assembly 136. The planetary reduction gear assembly 136 is provided with a splined output shaft which engages a corresponding splined shaft 138. A pawl teeter arm 140 is mounted to the splined shaft 138 for rotation therewith. A pivot pin 142 is provided in the end of the pawl teeter arm 140. A pawl teeter assembly 144 is mounted to the pivot pin 142 and is provided with a pawl 146 at one end thereof and a roller 148 at a second end thereof, as best seen in FIGS. 7–10. The pawl 146 engages an adjuster plate 150 which is provided with a semi-circular radial outermost surface having a plurality of teeth provided therein. The adjuster plate 150 is mounted to a hub portion 152 of a pivot arm 154. The pivot arm 154 of the right and left side clutch actuators 26, 28 are each attached to a link 156 which is attached to a cam retainer lever 158, 160 of the dual cam assembly 24, as shown in FIGS. 6–10. The pivot arm 154 is provided with a shaft extension 162 which is connected to a potentiometer 164 which measures the position of the pivot arm 154.

Figure 2:
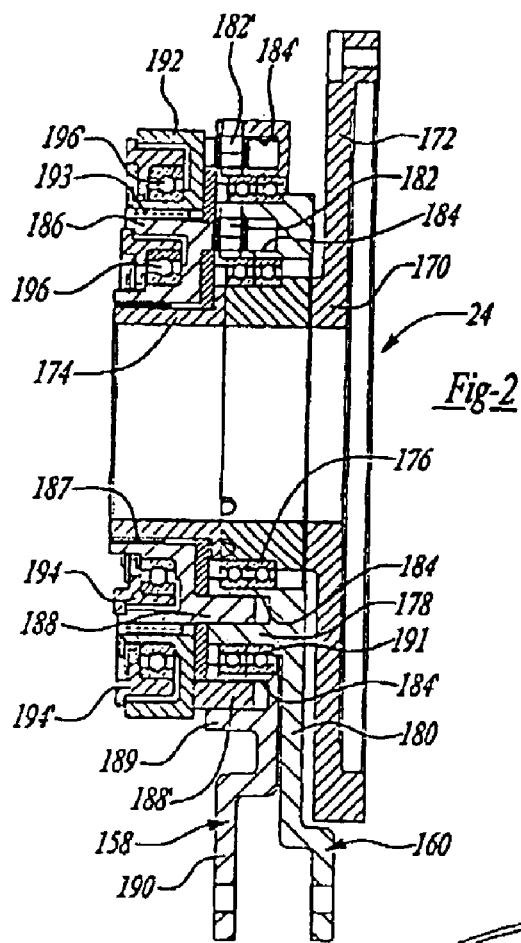
FIG. 2 is a detailed cross-sectional view of the dual cam assembly used for disengaging the dual clutch assemblies according to the principles of the present invention.
Figure 2A:
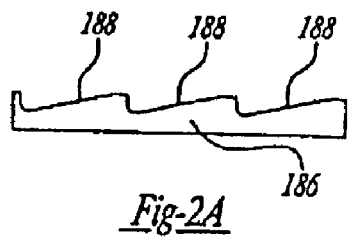
FIG. 2A is an illustration of the 2-4-6, hill holder cam profile.

As mentioned above, the pivot arms 154 of the right and left side clutch actuators 26, 28 are attached to linkages 156 which are in turn connected to cam retainer levers 158, 160 of dual cam assembly 24. With reference to FIG. 2, the dual cam assembly 24 will be described in greater detail. The dual cam assembly 24 is provided with a clutch ramp hub 170 which is provided with a flange portion 172 which mounts to the front plate 56 and a cylindrical body portion 174. The 2-4-6 cam retainer lever 160 is rotatably mounted to the cylindrical body portion 174 of clutch ramp hub 170 via a bearing assembly 176. The cam retainer lever 160 includes a ring-shaped body portion 178 and a lever arm portion 180 extending radially therefrom. The ring portion 178 of cam retainer lever 160 supports a plurality of cam rollers 182 along annular groove 184. A cam ring 186 is provided with a plurality of axially extending cam surfaces 188 which engage the cam rollers 184. FIG. 2A provides an illustration of the profile of the cam surfaces 188 of the cam ring 186. In this embodiment, the profile includes three cam surfaces 188 which each correspond to a cam roller 182. The cam ring 186 is slidably connected to the clutch ramp hub 170 by axial splines 187, wherein the rotation of cam retainer lever 160 relative to cam ring 186 causes the cam ring 186 to move axially relative to the clutch ramp hub 170 as the cam rollers 182 traverse against the sloped cam surfaces 188.

Figure 1:
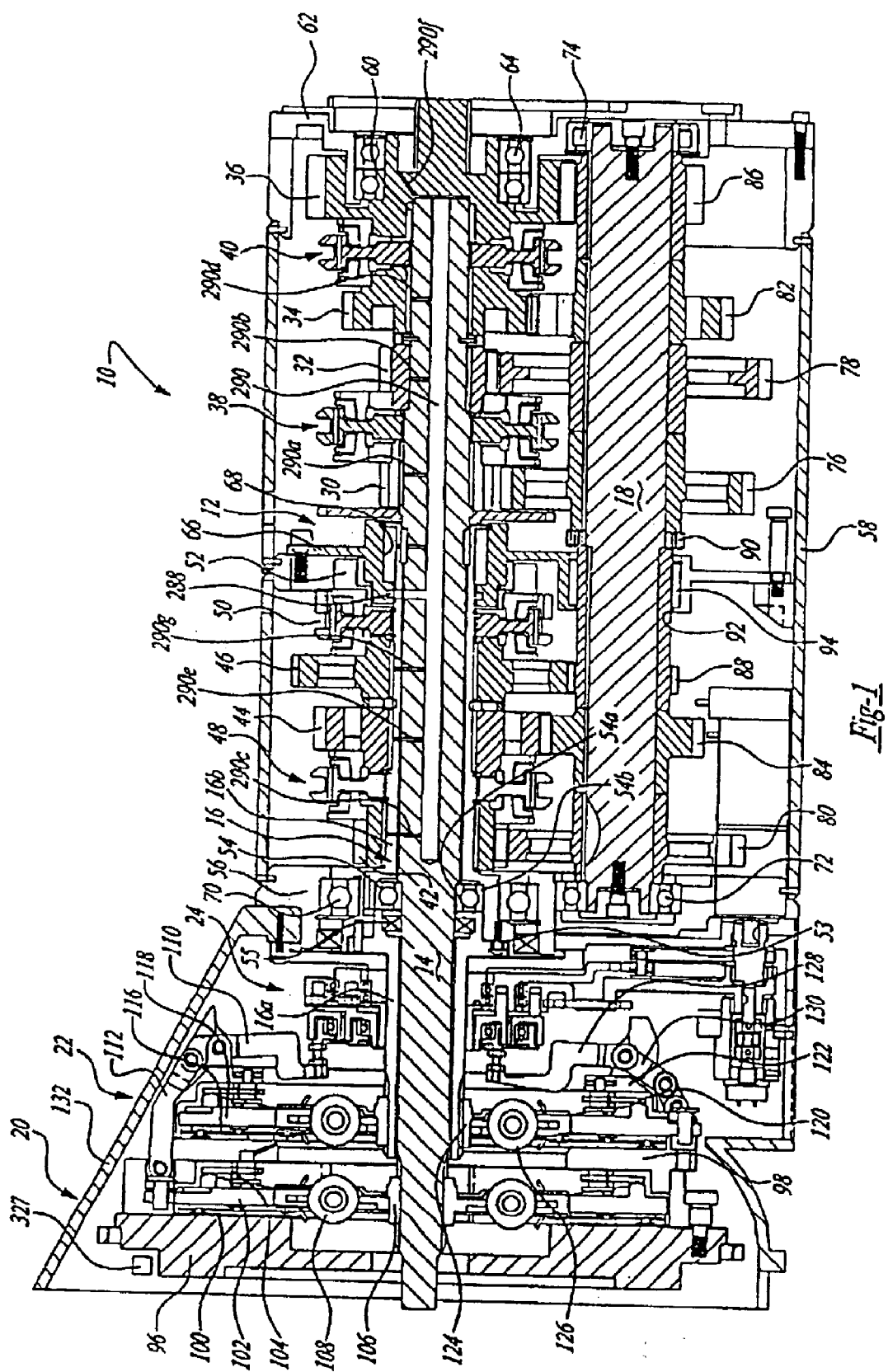
FIG. 1 is a sectional view of the electro-mechanical automatic transmission according to the principles of the present invention.
Figure 2B:
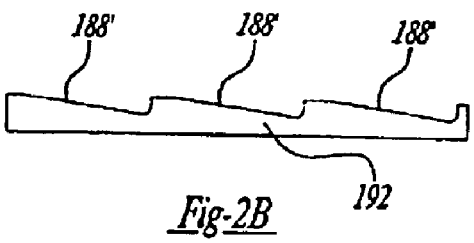
FIG. 2B is an illustration of the R-1-3-5 cam profile.
Figure 5:
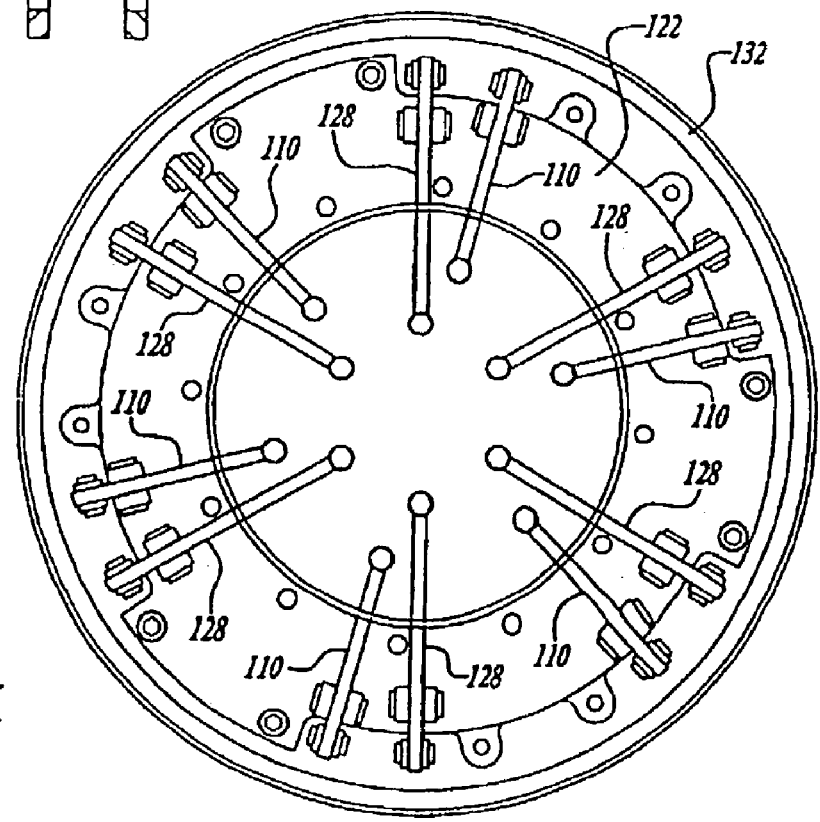
FIG. 5 is an end view of the dual clutch assembly according to the principles of the present invention.

The R-1-3-5 cam retainer lever 158 includes a ring shaped body portion 189 and a lever arm portion 190 extending radially therefrom. The ring shaped body portion 189 is provided with a bearing assembly 191 on the radial surface of the 2-4-6 cam retainer lever 160 so that the cam retainer lever 158 can rotate relative to the cam retainer lever 160. The cam retainer lever 158 also supports a plurality of cam rollers 182' along annular groove 184'. Each cam roller 182' corresponds with a sloped cam surface 188' of an outer cam ring 192. FIG. 2B provides an illustration of the profile of the cam surfaces 188' of the outer cam ring 192. In this embodiment, the profile includes three cam surfaces 188' which each correspond to a cam roller 182'. The outer cam ring 192 is splined to the inner cam ring 186 at 193 and is capable of moving axially relative thereto. Upon rotation of the cam retainer lever 158, the cam surfaces 188' move in engagement with cam rollers 182' to cause the outer cam ring 192 to move axially relative to the clutch ramp hub 170. The inner cam ring 186 and outer cam ring 192 are each provided with a cam release pad 194, 194' which is rotatably supported by the inner and outer cam rings 186, 192, respectively, via a bearing assembly 196, 196'. An O ring retainer 198, 198' and a retaining ring 200, 200' are provided for retaining the cam release pads 194, 194' in position relative to the inner and outer cam rings 186, 192. With reference to FIG. 1, the lever 110 of first clutch 20 and lever 128 of second clutch 22 each include an end portion which engage the cam release pads 194, 194' of the dual cam assembly 24. Accordingly, by rotation of cam retainer levers 158, 160 causing axial movement of cam release pads 194, 194', selective disengagement of the first and second clutch assemblies 20, 22 can be obtained.

Figure 6:
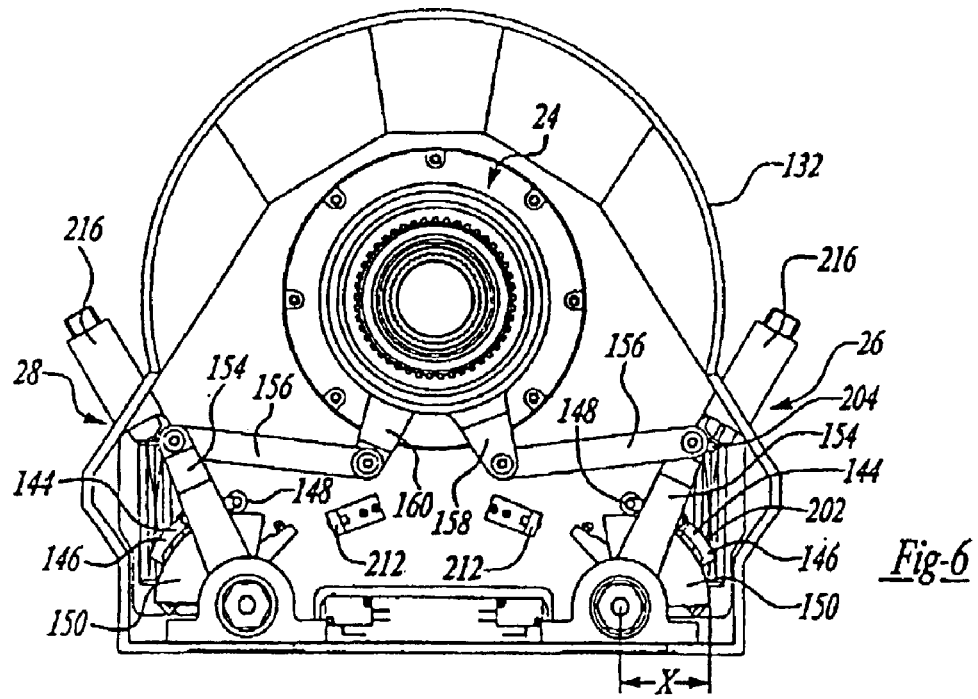
FIG. 6 is an end view of the clutch actuator assembly and dual cam assembly according to the principles of the present invention with each of the clutch actuator assemblies in the disengaged position.
Figure 7:
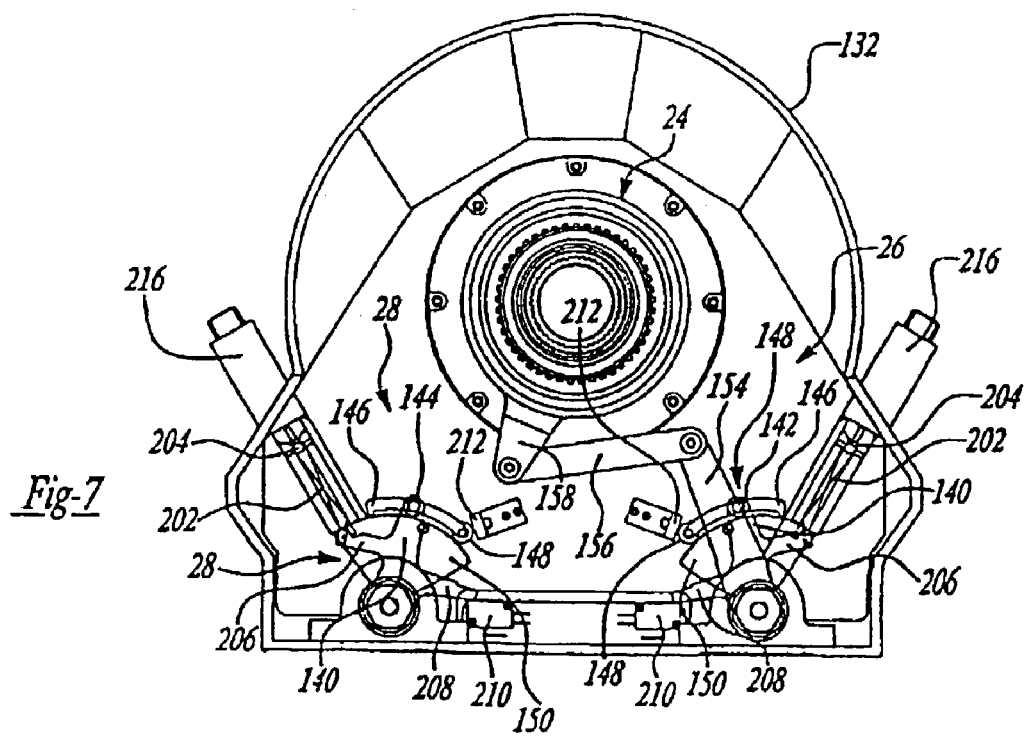
FIG. 7 is an end view of the clutch actuator and dual cam assembly as shown in FIG. 6, with the right side clutch actuator in the disengaged position.
Figure 10:
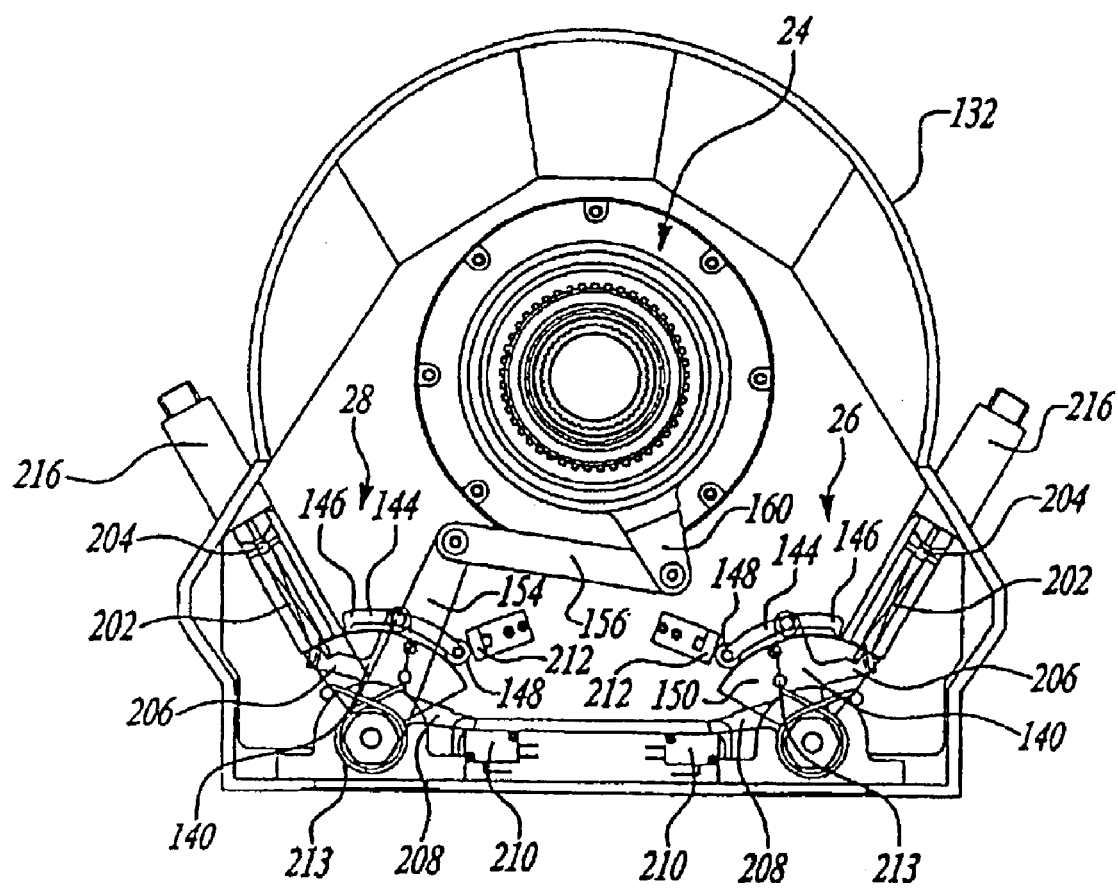
FIG. 10 is an end view of the clutch actuator assembly and dual cam assembly, with the left side clutch actuator in the adjust position.

With reference to FIGS. 6–10, the operation of the clutch actuators for engaging the first and second clutches 20, 22 will be described. As shown in FIG. 6, each of the clutch actuators 26, 28 are shown in the disengaged position. Each clutch actuator 26, 28 is provided with an assist spring 202 which is adjustably mounted at a first end to the bell housing 132 by a ball socket joint 204 and which is connected at a second end to an assist arm 206 which extends from the pawl teeter arm 140, as best shown in FIGS. 7–10. The assist springs 202 can be adjusted via a spring adjustment device 216 which can include, for example, a threaded adjustment apparatus for continuously variable adjustment of the compression amount of the assist spring 202. The pawl teeter arm 140 is also provided with a switch activation arm 208 which engages a switch 210 which shuts off the electric motor 134 of the actuators 26, 28. The assist spring 202 is designed so as to provide an increasing assist force as the pawl teeter arm 140 is rotated from the engaged to the disengaged positions. In other words, as shown in FIG. 7, the spring force of the assist spring 202 acts through the axis of rotation of the pawl teeter arm 140. As the electric motor 134 drives the pawl teeter arm 140, the moment arm upon which the assist spring 202 acts upon the pawl teeter arm 140 increases with the rotation of the pawl teeter arm 140. This can best be seen in FIG. 6 wherein the pawl teeter arm 140 in the disengaged position is rotated so that the assist spring 202 acts on a large moment arm X in order to provide a large assist force. The need for the increasing assist force is due to the increasing spring force of the Belleville springs 104 and 120 which bias the pressure plates 102 and 118 of first and second clutches 20, 22, respectively, into the normally engaged position. Accordingly, as the pressure plates 102, 118 are moved away from the engaged position, the force of the Belleville springs 104, 120 increases. Thus, in order to consistently reduce the required motor force for disengaging the clutches 20, 22, the assist spring 202 and increasing moment arm arrangement of the present invention provides a consistently increasing assist force.

Upon rotation of the pawl teeter arm 140, the pawl 146 of the pawl teeter assembly 144 transmits torque to the adjuster plate 150 and pivot arm 154 which is mounted for rotation therewith. When the clutch actuators 26, 28 are in the normally engaged position such as shown in FIGS. 7 and 9, respectively, the switch activation arm 208 rests against the switch 210 and the roller 148 of pawl teeter assembly 144 rests against the stop surface 212.

As the clutch discs wear down, the clutch actuators 26, 28 are provided with an automatic adjustment feature wherein as the roller 148 of pawl teeter assembly 144 rests against the stop surface 212, the pawl 146 is allowed to disengage from the serrated teeth of the adjuster plate 150 so that the adjuster plate 150 is free to move relative to the pawl teeter assembly 144. Preload springs 213 are provided to apply a tension force between the adjuster plate 150 and the pawl teeter arm 140 in order to preload the adjuster plate 150 and thus bring the dual cam assembly to the fully engaged position. Accordingly, as the clutch disks wear down, the adjuster plates 150 rotate further as biased by the preload spring 213 during the adjustment in order for the clutch to become fully engaged. Upon subsequent activation of the clutch actuator, the pawl 146 will re-engage with the adjuster plate 150 and the clutch actuator is automatically adjusted to compensate for wear of the clutch disks. Thus, clutch clamp load and torque capacity are maintained. The clutch actuators 26, 28 are mounted to the housing 132 by clutch actuator mounts 214. It should be readily understood to one of ordinary skill in the art that the operation of the left and right clutch actuators 26, 28 is identical and that further description with respect to the left and right clutch actuators 26, 28 is unnecessary in view of this similarity of operation.

Figure 11:
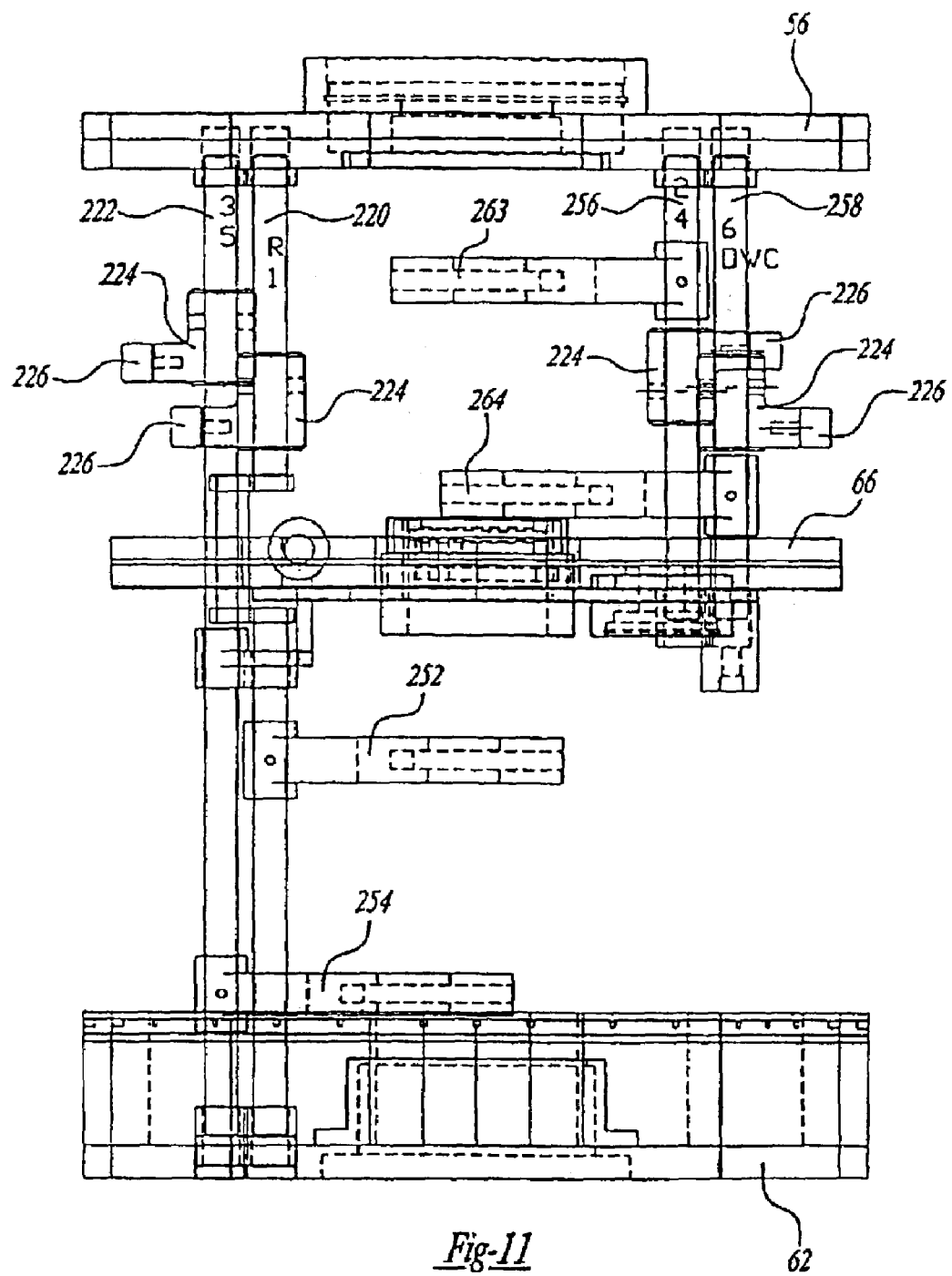
FIG. 11 is a top view of the shift rail assembly according to the principles of the present invention.
Figure 12:
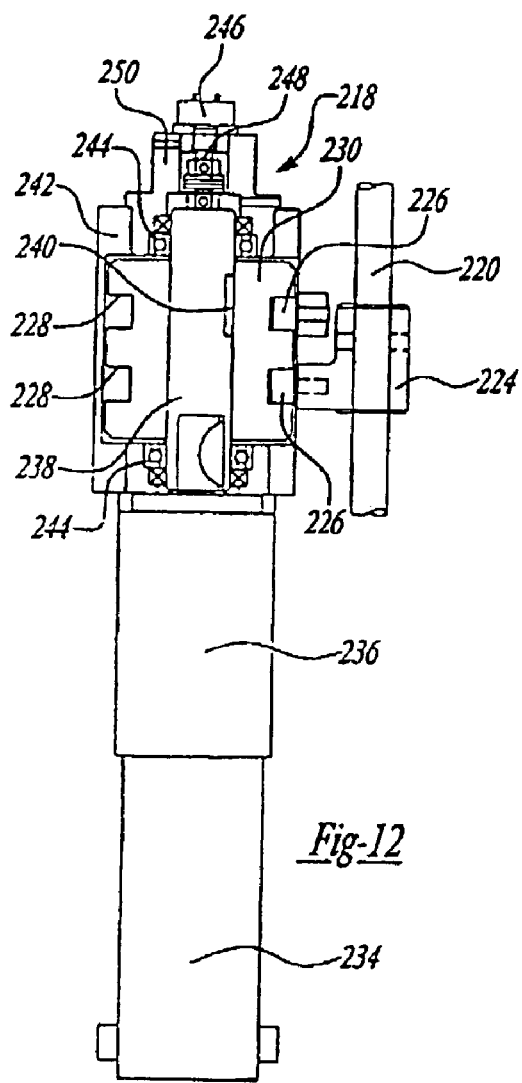
FIG. 12 is a sectional view of the R-1-3-5 shift actuator according to the principles of the present invention.
Figure 13:
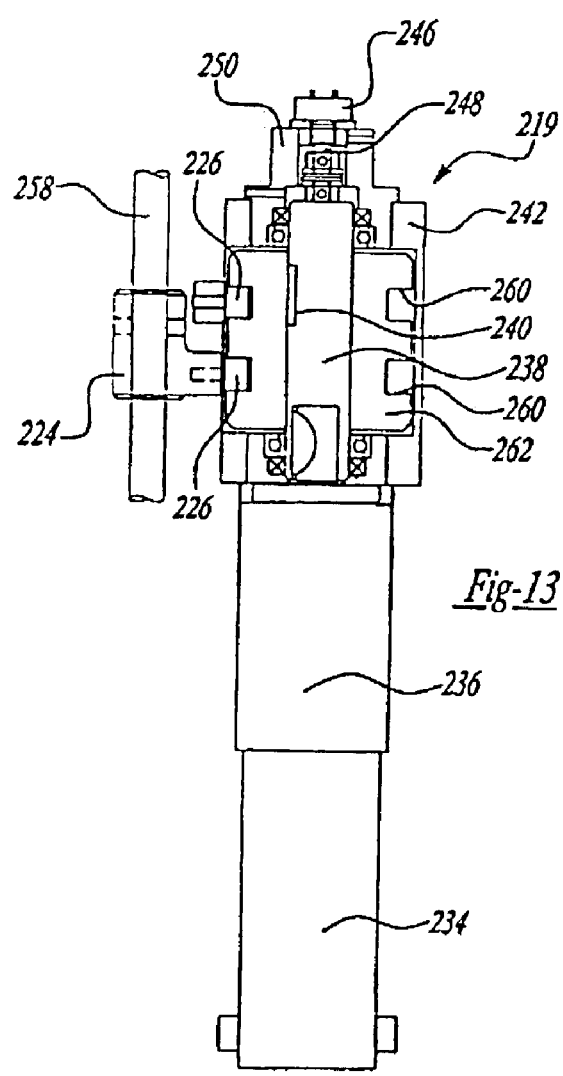
FIG. 13 is a sectional view of the 2-4-6-Hill Holder shift actuator according to the principles of the present invention.
Figures 14, 15:
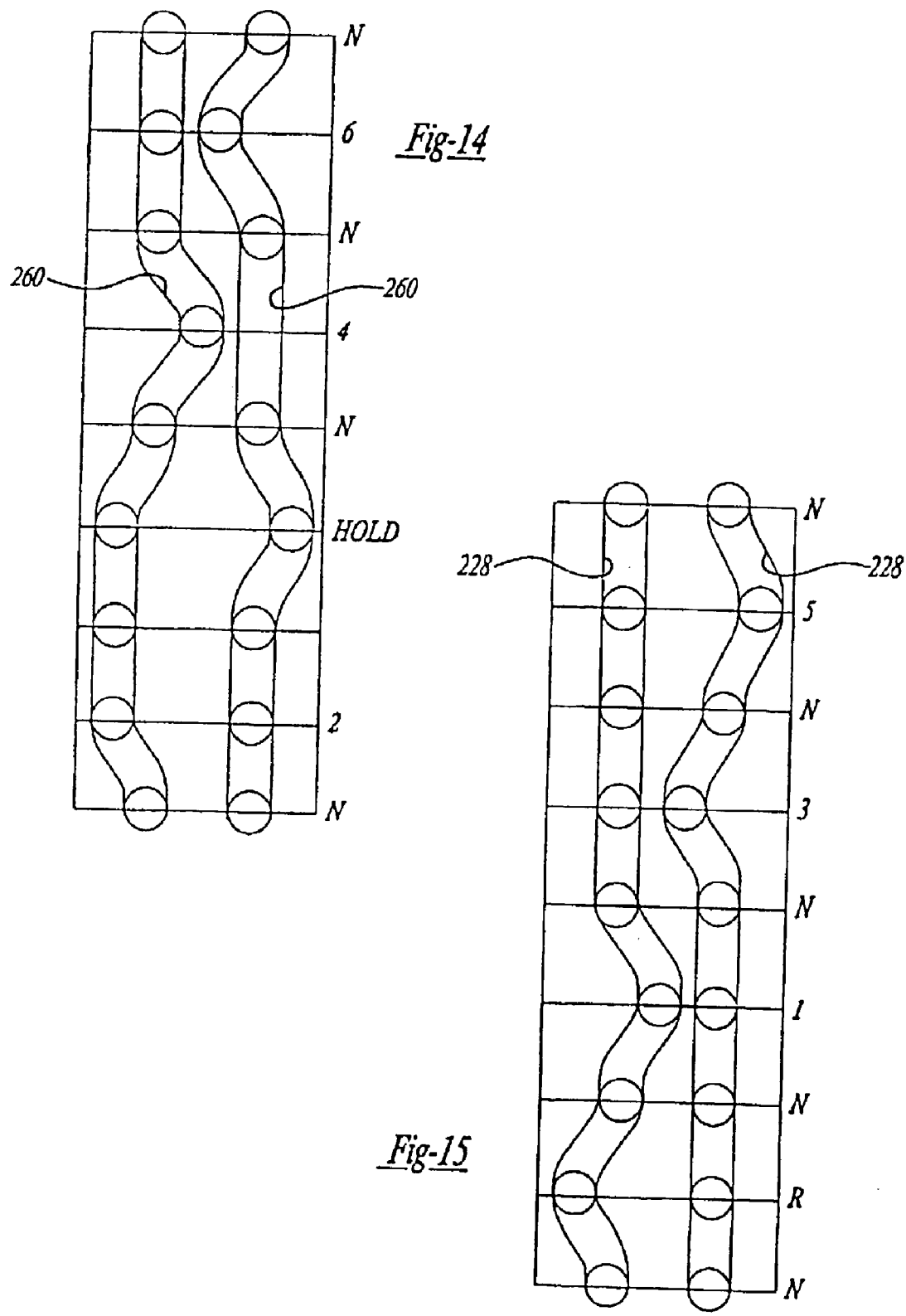
FIG. 14 is an illustration of the cam grooves provided in the 2-4-6-Hill Holder shifter cam according to the principles of the present invention.
FIG. 15 is an illustration of the cam grooves of the R-1-3-5 shifter cam according to the principles of the present invention.
Figure 16:
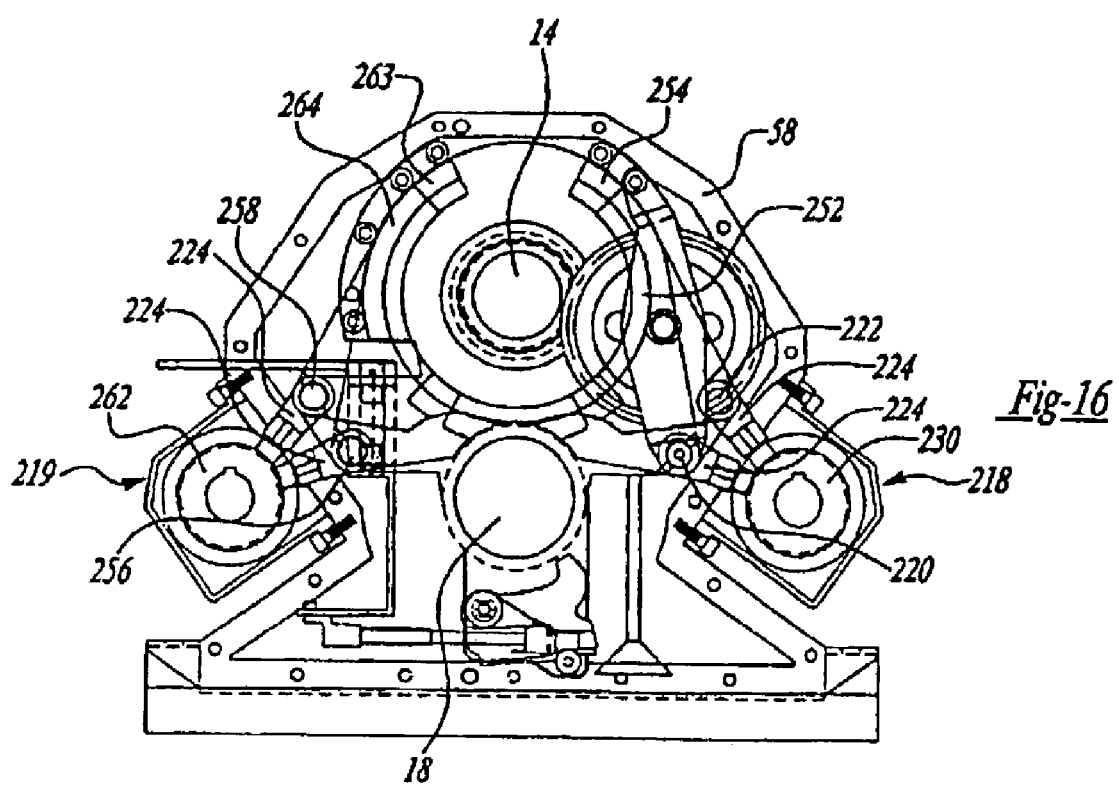
FIG. 16 is an end view of the electro-mechanical automatic transmission according to the principles of the present invention, with parts removed in order to illustrate the shift actuators, parking brake, and reverse idler gear/lube pump mechanism according to the principles of the present invention.

The shift actuators 218, 219, according to the present invention will now be described with reference to FIGS. 11–16. The dual clutch automatic transmission 10, according to the present invention, is provided with a first shift rail 220 and a second shift rail 222 each provided with a shift lug 224 securely fastened to the shift rails and each having a cam roller 226 (as shown in FIG. 12) which operatively engage cam grooves 228 provided in a barrel-shaped shifter cam 230 of the R-1-3-5 shift actuator 218. The configuration of the cam grooves 228 for the R-1-3-5 shift actuator 218 is shown in FIG. 15. As shown in FIG. 12, the R-1-3-5 shift actuator 218 includes an electric motor 234 which drives a planetary reduction gear assembly 236. The planetary reduction gear assembly 236 drives a shaft 238 which is connected to the shifter cam 230 by a keyway 240. The shifter cam 230 is provided within a housing 242 and is supported by a pair of bearings 244. A potentiometer 246 is provided for measuring the position of the shifter cam 230. The potentiometer 246 is connected to the shaft 238 by a coupler 248 which is disposed within a housing extension 250. The shifter cam 230, upon rotation, drives shift lugs 224 mounted on first and second shift rails 220, 222 for selectively moving the shift rails and thus the shift forks 252, 254 mounted to the shift rails 220, 222, respectively, as shown in FIG. 11. The shift fork 252 is associated with the reverse-first gear synchronizer device 38. The shift fork 254 is associated with the third-fifth gear synchronizer 40.

The electromechanical automatic transmission is also provided with third and fourth shift rails 256, 258, respectively, which are each provided with a shift lug 224 securely mounted to each shift rail 256, 258. Each shift lug 224 includes a cam roller 226 which operatively engage cam grooves 260 provided in the shifter cam 262 of shift actuator 219, as shown in FIG. 13. The cam grooves 260 for the shift actuator 219 are shown in FIG. 14. A 2-4 shift fork 263 is mounted on the shift rail 256 for actuating the second-fourth speed synchronizer 48. A sixth-Hill Holder shift fork 264 is mounted to the shift rail 258 for selectively engaging the sixth-Hill Holder synchronizer 50. With reference to FIG. 13, the 2-4-6 shift actuator 219 has substantially the same construction as the R-1-3-5 shift actuator 218 shown in FIG. 12.

With reference to FIG. 17, a powertrain controller 320 is provided for operating the clutch actuators 26, 28 and the shift actuators 218, 219. The powertrain controller 320 provides signals to the driver motors 134 of the clutch actuators 26, 28 as well as to the driver motors 234 of the shift actuators 218, 219. The powertrain controller 320 also monitors the position of the clutch actuators 26, 28 as well as the shift actuators 218, 219 via potentiometers 164, 246, respectively. Normal and uninterrupted power shifting between gears is accomplished by engaging the desired gear prior to a shift event. The transmission 10 of the present invention can be in two different gear ratios at once, preferably with only one clutch 20, 22 being engaged for transmitting power during normal operation. In order to shift to a new gear ratio, the current driving clutch will be released during normal operation via the corresponding clutch actuator and the released clutch will be engaged via the corresponding clutch actuator. The two clutch actuators perform a quick and smooth shift as directed by the powertrain controller 320 which monitors the speed of the input shafts 14 and 16 via speed sensors 322 and 324, respectively, as well as the speed of the driven shaft 18 via a speed sensor 326. Alternatively, the controller 320 can determine the speed of the input shafts 14 and 16 based upon the known gear ratio and the speed of the driven shaft 18 as detected by sensor 326. An engine speed sensor 327 is also provided and detects the speed of the flywheel 96. Based upon the accelerator pedal position as detected by sensor 328, the vehicle speed, and the current gear ratio, the powertrain controller 320 anticipates the next gear ratio of the next shift and drives the shift actuators 218, 219, accordingly, in order to engage the next gear ratio while the corresponding clutch actuator is in the disengaged position. As a gear is engaged, the corresponding input shaft which is disengaged from the engine output shaft becomes synchronized with the rotational speed of the driven shaft 18. At this time, the clutch which is associated with the current driving input shaft is disengaged and the other clutch is engaged in order to drive the input shaft associated with the selected gear.

Referring to FIG. 18, the method of double-downshifting the dual clutch automatic transmission 10 using the double-downshift gear strategy 410 according to the principles of the present invention will now be described. With regard to the description in FIG. 18, FIG. 19 graphically illustrates the engine speed and the torque loads of the first clutch 20 and the second clutch 22 over time. For exemplary purposes, the double-downshift gear strategy 410 will be described as a double-downshift from a sixth drive gear ratio to a fourth drive gear ratio. However, as will be apparent to those skilled in the art, the double-downshift gear strategy 410 may be used with any combination of drive gear ratios.

Initially, the second clutch 22 is fully engaged with the sixth speed gear 46 and the engine is operating at a sixth gear ratio target speed. This sixth gear ratio target speed corresponds to an engine speed associated with full torque transfer to the sixth speed gear 46. Full torque from the engine is transferred through the engine output shaft, through the second input shaft 16, through the second clutch 22 to the sixth speed gear 46, and then to the drive shaft 18. The first clutch 20 is connected with the fifth speed gear 36, however, the first clutch 20 is not engaged by the first clutch actuator 26 and therefore no torque is transferred from the engine output shaft to the first input shaft 14.

Again referring to FIG. 18, based upon the accelerator pedal position as detected by sensor 328, the vehicle speed, and the current gear ratio, the powertrain controller 320 determines if a double-downshift is required at step 412. If a double-downshift is required, the powertrain controller 320 orders the second clutch actuator 28 to reduce the torque transferred through the second clutch 22 to a very low torque level which will provide a desired rate of engine acceleration as shown in 414. The torque transferred through the second clutch 22 is reduced to approximately 10% of full torque. This reduction in transferred torque allows the engine speed to rapidly increase. The rate of engine speed increase is approximately 4,000 to 6,000 rpm's per second. Then the first clutch 20 is applied to the touch point torque level as described in step 416. This action allows the first clutch 20 to respond immediately when engine speed reaches a fifth gear ratio target speed.

The controller 320 then checks if engine speed exceeds the fifth gear ratio target speed as shown in 418, corresponding to an engine speed associated with full torque transfer to the fifth speed gear 36. Then, the powertrain controller 320 orders the first clutch actuator 26 to rapidly engage the first clutch 20. The torque applied to the fifth speed gear 36 is rapidly increased to approximately 90% of full torque to limit the increase in engine speed and avoid excessive slip. This increase in torque decreases the rate at which the engine speed increases, shown at step 420.

Next, the controller 320 checks if engine speed has leveled off at a speed exceeding the fifth gear ratio target speed by monitoring engine speed acceleration as shown in 422. Specifically, the controller 320 checks if the engine acceleration has been reduced to near zero. This action indicates that the first clutch 20 has been applied. At this time the controller orders the second clutch 22 to completely disengage as shown in step 424. The next step is to switch the shifter in order to shift the second clutch 22 to the required target gear as shown in 425.

The powertrain controller 320 calculates the time ($T_{calculated}$) it takes to reach the $4^{th}$ speed target speed at the achievable engine acceleration rate as shown in 426. It compares this time to the desired time ($T_{desired}$) as shown in 428, which is calculated based on the time it takes for the shift interlock system to switch. If the time calculated is less than the time desired as shown in 430, the engine speed is held by applying a specific torque level through the first clutch 20 at the fifth gear ratio target speed plus a calibrated value. The calibrated value may be any numeric number predetermined by experimentation. On the other hand, if the time calculated is greater than the time desired as shown in 432, the powertrain controller 320 orders the first clutch actuator 26 to reduce the transferred torque through the first clutch 20 to the fifth speed gear 36, shown at step 432. The torque transferred through the first clutch 20 is reduced to a torque level that will provide a desired rate of engine acceleration. This acceleration will synchronize the second clutch 22 application with the engine speed equal to the sixth gear ratio target speed. This torque level is at the touch point torque level plus a constant. The constant equals a predetermined calibrated value.

Once the torque transferred through the first clutch 20 to the fifth speed gear 36 has been reduced at step 432, the engine speed will rapidly increase. The rate of engine speed increase is approximately 4,000 to 6,000 rpm's per second. When the engine speed exceeds a fourth gear ratio target speed as shown in step 434, corresponding to an engine speed associated with full torque transfer to the fourth speed gear 44, the powertrain controller 320 orders the first clutch actuator 26 to increase the transferred torque through the first clutch 20 to the $4^{th}$ speed gear 36. Transferred torque to the $4^{th}$ speed gear 36 is rapidly increased as shown in step 436 to hold engine speed at target ($4^{th}$ gear speed plus a calibrated value). This increase in transferred torque levels off the engine speed at a speed exceeding the fourth gear ratio target speed, shown at 438 in FIG. 19, indicating that the second clutch has been applied.

If the engine acceleration is near zero, shown at step 439, the powertrain controller 320 then orders the first clutch actuator 26 to reduce the transferred torque through the first clutch 20 to the fifth speed gear 36 at step 440. Transferred torque to the fifth speed gear 36 is rapidly reduced so that no torque is transferred through the first clutch 20 to the fifth speed gear 36. Simultaneously with step 440, the powertrain controller 320 orders the second clutch actuator 28 to increase the torque transferred through the second clutch 22 to the fourth speed gear 44, shown at step 440. The transferred torque to the fourth speed gear 44 is rapidly increased faster than the clutch release to full torque transfer from the engine output shaft. This forces the engine speed to decrease to the fourth gear target engine speed.

Using the double-downshift gear strategy 410 described above, total shift time is approximately 0.6 to 0.8 seconds from the decision to begin the double-downshift gear strategy 410 at step 412 to the reduction of engine speed to the fourth gear ratio target speed at step 440. The shift time of the second clutch 22 from disengagement from the sixth speed gear 46 to engagement and full torque transfer to the fourth speed gear 44 is approximately 0.25 seconds. Moreover, by operating the engine near the fifth gear ratio target speed, the durability of the clutch is improved because the energy dissipated in the clutch assembly during the double downshift is minimized.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. In a motor vehicle having an engine and a transmission including a first clutch assembly for transferring torque from the engine to a first driven gear pair having a first gear ratio and to a second driven gear pair having a second gear ratio larger than the first gear ratio, and a second clutch assembly for transferring torque from the engine to a third driven gear pair having a third gear ratio larger than the first gear ratio and smaller than the second gear ratio, a method of double-downshifting from the first gear ratio to the second gear ratio using the same clutch assembly comprising the steps of:

reducing torque transfer from the first clutch to the first driven gear;

increasing engine speed;

increasing torque transfer from the second clutch to the third driven gear while simultaneously disengaging the first clutch from the first driven gear;

reducing torque transfer from the second clutch to the third driven gear;

increasing torque transfer from the second clutch to the third driven gear;

engaging the first clutch to the second driven gear;

increasing torque transfer from the first clutch to the second driven gear while simultaneously reducing torque transfer from the second clutch to the third driven gear; and disengaging the second clutch from the third driven gear.

2. The method of double-downshifting of claim 1, wherein the step of increasing torque transfer from the second clutch to the third driven gear while simultaneously disengaging the first clutch from the first driven gear occurs when engine speed approximately reaches a third gear ratio target speed.

3. The method of double-downshifting of claim 2, wherein the step of increasing torque transfer from the second clutch to the third driven gear while simultaneously disengaging the first clutch from the first driven gear occurs when engine speed exceeds the third gear ratio target speed.

4. The method of double-downshifting of claim 1, wherein the step of increasing torque transfer from the second clutch to the third driven gear occurs when engine speed is within approximately 200 to 300 rpm's of a second gear ratio target speed.

5. The method of double-downshifting of claim 1, wherein the step of increasing torque transfer from the first clutch to the second driven gear while simultaneously reducing torque transfer from the second clutch to the third driven gear occurs when engine speed is held at a speed exceeding the second gear ratio target speed.

6. The method of double-downshifting of claim 5, wherein the step of increasing torque transfer from the first clutch to the second driven gear while simultaneously reducing torque transfer from the second clutch to the third driven gear reduces engine speed to the second gear ratio target speed.

7. The method of double-downshifting of claim 1, wherein during the step of reducing torque transfer from the first clutch to the first driven gear, the torque is reduced to a touch point torque level.

8. The method of double-downshifting of claim 1, wherein during the step of increasing torque transfer from the second clutch to the third driven gear while simultaneously disengaging the first clutch from the first driven gear, the torque from the second clutch is increased to a value dependent on a desired rate of engine acceleration.

9. The method of double-downshifting of claim 1, wherein during the step of reducing torque transfer from the second clutch to the third driven gear, the torque is reduced to a touch point torque level plus a calibrated value.

10. The method of double-downshifting of claim 1, wherein during the step of increasing torque transfer from the second clutch to the third driven gear, the torque is increased to a level that will decrease a rate of engine acceleration.

11. The method of double-downshifting of claim 1, wherein during the step of increasing torque transfer from the first clutch to the second driven gear while simultaneously reducing torque transfer from the second clutch to the third driven gear, the torque transfer between the first clutch and the second driven gear is increased to 100% of full torque transfer to the second driven gear.

12. In a motor vehicle having an engine and a transmission including a first clutch assembly for transferring torque from the engine to a first driven gear pair having a first gear ratio and to a second driven gear pair having a second gear ratio larger than the first gear ratio, and a second clutch assembly for transferring torque from the engine to a third driven gear pair having a third gear ratio larger than the first gear ratio and smaller than the second gear ratio, a method of double-downshifting from the first gear ratio to the second gear ratio comprising the steps of;
reducing torque transfer from the first clutch to the first driven gear pair;
disconnecting the first clutch from the first driven gear pair;
increasing engine speed from a first gear ratio target speed to a second gear ratio target speed;
managing the rate of increase of an engine speed by selectively engaging the second clutch to the third driven gear pair;
engaging the first clutch to the second driven gear pair;
increasing torque transfer from the first clutch to the second driven gear pair while simultaneously reducing torque transfer from the second clutch to the third driven gear pair; and
disengaging the second clutch from the third driven gear pair.

13. The method of double-downshifting of claim 12, wherein the step of managing the rate of increase of the engine speed includes the steps of;
increasing torque transfer from the second clutch to the third driven gear pair while simultaneously disengaging the first clutch from the first driven gear pair,
reducing torque transfer from the second clutch to the third driven gear pair, and
increasing torque transfer from the second clutch to the third driven gear pair.

14. The method of double-downshifting of claim 13, wherein energy dissipated in the second clutch is minimized.

* * * * *